United States Patent [19]

Schauer et al.

[11] Patent Number: 5,059,134

[45] Date of Patent: Oct. 22, 1991

[54] APPARATUS FOR PROVIDING AN ELECTRICAL CONDUCTION PATH BETWEEN TWO CONTACT LOCATIONS WHICH ARE ROTATABLE WITH RESPECT TO EACH OTHER

[75] Inventors: Friedrich Schauer, Heroldsberg; Hans Berthold, Eckental; Manfred Wolff, Schwarzenbruck; Kurt Wölfel, Nürnberg, all of Fed. Rep. of Germany

[73] Assignee: Kabelmetal Electro GmbH, Hanover, Fed. Rep. of Germany

[21] Appl. No.: 597,536

[22] Filed: Oct. 15, 1990

[30] Foreign Application Priority Data

Oct. 25, 1989 [DE] Fed. Rep. of Germany ....... 3935529

[51] Int. Cl.$^5$ .............................................. H01R 9/07
[52] U.S. Cl. ..................................... 439/164; 439/499
[58] Field of Search ............... 439/164, 456, 459, 460, 439/499

[56] References Cited

U.S. PATENT DOCUMENTS 3,713,073  1/1973  Narozny ............................... 439/456
4,586,776  5/1986  Ollis et al. ............................ 439/459
4,927,365  5/1990  Schauer et al. ................. 439/164 X Primary Examiner—Eugene F. Desmond
Attorney, Agent, or Firm—James C. Jangarathis

[57] ABSTRACT

An apparatus is described for providing an electrical conduction path between two contact locations rotatable one with respect to the other. A flat ribbon cable having a plurality of electrical conductors and being wound in the manner of a coiled spring, is connected to the contact locations by way of connection lines serially connected to the ends of the flat ribbon cable. To protect the flat ribbon cable from mechanical damage at each of its ends, an end portion of each of the electrical conductors is serially connected to an end portion of one of a plurality of connection conductors of the connection line at a connection location, and a connection assembly is formed about the end portions of the serially connected conductors. The connection assembly is comprised of a clamping body positioned about and engaging a portion of each of the connection conductors so as to restrict axial movement therebetween; and a protective sheath that encompasses the connection locations of each of the serially connected conductors, while engaging the clamping body to restrict axial movement therebetween.

4 Claims, 2 Drawing Sheets

APPARATUS FOR PROVIDING AN ELECTRICAL CONDUCTION PATH BETWEEN TWO CONTACT LOCATIONS WHICH ARE ROTATABLE WITH RESPECT TO EACH OTHER

The invention relates to an apparatus for maintaining an electrical conduction path between two contact locations rotatable with respect to each other; and, more particularly, to such an apparatus comprising a flat ribbon cable wound as a coiled spring, and having ends thereof firmly attached to such contact locations by way of connection lines.

BACKGROUND OF THE INVENTION

It is priorly known to provide a conduction path between two contact locations of which one is movable on a circular path, while the other is disposed stationary outside such circular path. Apparatus having such conductor paths include, for instance, cable coilers in which the electric cable or cord is wound on a reel. The cord can be pulled out of the housing of the apparatus. Under the action of a spring it is automatically rolled up again after a pulling force is removed. One essential problem here is the transfer of current from the stationary firm attachment of the apparatus to the end of the line which is arranged turnably on the spool.

For the transfer of current between contact locations which move relative to each other, wiper contacts or rings are priorly known. Such arrangements are subject to wear and are at a disadvantage in the case of low current intensities because of higher transfer resistances.

U. S. Pat. No. 4,696,523, issued Sept. 29, 1987, is directed to a priorly known apparatus including a conductive path between two contact locations which are rotatable with respect to each other. In this apparatus, the conduction path is comprised of a flat ribbon cable wound in the manner of a coiled spring. Upon the rotation of on of the contact locations in one direction, the windings of such coiled spring are pulled together to reduce the diameter of the coiled spring, while rotation in the opposite direction causes the windings of such coil springs to expand and increase the diameter of the coiled spring. Accordingly, the relative movement of the two contact locations connected by such coiled spring results in a "breathing motion", similar to a watch spring. To protect against the considerable mechanical stress and kinking of the end portions of the flat ribbon cable firmly attached to the corresponding contact locations, such prior art apparatus include strip-shaped stabilizers at each of the connections between the flat ribbon cable and the contact locations each of such stabilizers being of dimensionally stable plastic and having a U-shaped cross section for closely enclosing the associated end portion of the flat ribbon cable.

U. S. Pat. No. 4,836,795, issued June 6, 1989, is directed to a priorly known apparatus for providing an electrical conduction path between a first contact location rotatable a plurality of rotations, in either direction, about a longitudinal axis, and a stationary contact location positioned radially from the rotatable contact location. Such apparatus is comprised of a bifilar spiral spring formed of a length of flat ribbon cable having at least two electrical conductors. The bifilar spiral coil spring is secured only by firmly attached connections at its opposite ends to the two contact locations; whereby it uncoils and slidably moves in response to the direction of rotation of the rotatable contact location, and upon reversal of such rotation, recovers its original shape and position between the two contact locations.

U. S. Pat. No. 4,927,365, issued May 22, 1990, is directed to a priorly known apparatus comprising an electrical conductive path between two contact locations rotatable, one with respect to the other. The electrical conduction path comprises a flat ribbon cable, including at least two electrical conductors, that is wound in the manner of a coiled spring. The flat ribbon cable is firmly attached at a first end thereof to one of the contact locations, while the other end thereof is firmly attached to the other contact location. To protect the flat ribbon cable from kinking and mechanical damage at each of the ends thereof, each end portion thereof is folded across an immediately adjacent portion and a stabilizer connection assembly is positioned to extend across both such portions. Each such assembly is comprised of a protective sheath of flexible insulating material positioned closely about the folded end portion, and an angular attachment of molded insulating material, including a clamping segment and a ribbon-shaped segment extending at an angle one to the other.

With all such prior art apparatus wherein a flat ribbon cable is provided between a first contact location rotatable a plurality of rotations in either direction, about a longitudinal axis, and a stationary contact location positioned radially from the rotatable contact location, the connected ends of the flat ribbon cable are subject to damage due to tension and bending stresses. Additionally, since such cables often comprise a plurality of electrical conductors of minimal, flat cross-sections, their ability to withstand such high tension and bending stresses is quite limited.

OBJECTS OF THE INVENTION

An object of the present invention is to provide a novel apparatus for maintaining a conductive path between two contact locations rotatable with respect to each other, such conductive path comprising a flat ribbon cable at least one end of which is connected to a connection line that is firmly attached to one of said contact locations. Another object of the present invention is to provide such a novel apparatus in which the end portions of the flat ribbon cable in the vicinity of the respective contact locations are protected against mechanical damage and kinking.

SUMMARY OF THE INVENTION

These and other objects of the present invention are achieved by an apparatus comprising an electrical conduction path between two contact locations rotatable one with respect to the other. In the main, the electrical conduction path comprises a flat ribbon cable including at least two electrical conductors. At each end of the flat ribbon cable, there is provided a length of a connection line including a similar number of connection conductors serially connected, at adjacent connection locations, to the electrical conductors. Positioned about the adjacent connection locations is a connection assembly comprised of a clamping structure that engages each of the connection conductors so as to restrict axial movement therebetween, and a protective sheath extending about the adjacent connecting locations, and positional about and engaging the clamping structure so as to restrict axial movement therebetween.

BRIEF DESCRIPTION OF THE DRAWINGS

A better understanding of the present invention as well as the objects and advantages thereof will become apparent upon consideration of the following disclosure thereof, especially when taken with the accompanying drawings, wherein:

Referring to FIG. 1 there is depicted two circular walls 1 and 2 of a housing of an electric apparatus. This apparatus may function as a control apparatus for anti-rebound protection when installed in the steering shaft of an automobile. In order to provide an electric signal to an electronic system 3 of this apparatus, the apparatus is connected to a battery 4. The battery 4 is connected via an electric cable 5 to a fixed contact location 6. The electronic system 3 is connected by an electric line 7 to a contact location 8 which is rotatable in the direction indicated by a double-ended arrow 9. Between the two contact locations 6 and 8 there is a coiled spring formed of a length of flat ribbon cable 10 of a priorly known type positioned about the rotatable contact location 8. Upon rotation of the rotatable contact location 8 in one direction, the windings of the flat ribbon cable 10 are pulled together to reduce the diameter of the coiled spring; while the rotation in the opposite direction causes the windings of the coiled spring to expand and increase in diameter. Accordingly, the relative movement between the two contact locations 6 and 8 connected, in the main, by the flat ribbon cable 10 results in a "breathing motion". Although the number of revolutions of a steering wheel of an automobile is limited to about six revolutions, the length of the flat ribbon cable 10 is such as to provide substantially more than six windings between the contact locations 6 and 8. Thus, a single revolution of the contact location 8 is not substantially perceptible. Each end of the flat ribbon cable 10 is connected by means of a connection assembly 17 and a connection line 20 to one of the contact locations 6 or 8. Each connection assembly 20, features of which are described hereafter with respect to FIGS. 3 and 4, is fastened to the corresponding contact location 6 or 8, for example, by welding or bonding, or by a clamp or snap engagement.

Referring to FIG. 2, there is depicted an apparatus for maintaining a conduction path between a contact location 8' rotatable about the longitudinal axis of a steering column of an automobile, and a fixed contact location 6' radially positioned from the rotatable contact location 8'. Such apparatus includes a bifilar spiral coil spring 12' formed of a length of flat ribbon cable 10', including a plurality of electrical conductors. In particular, the flat ribbon cable 10' is configured so as to have one portion thereof bent over, at a reversing location 13', onto the remaining portion thereof, and thereafter being formed as the bifilar spiral coil spring 12' with the reversing location 13' as its center. Each of the ends of the flat ribbon cable 10' is connected to one of the contact locations 6' or 8' by way of a connection assembly 17' and a connection line 20' of the same type referred to above with respect to FIG. 1. Each of the two portions of the flat ribbon cable 10' divided at the reversing location 13', is of a length sufficiently greater than the distance between the stationary contact location 6' and the rotatable contact location 8' such that the bifilar spiral coil spring 12' has a diameter in its original shape and position at most identical with the shortest distance between the contact locations 6' and 8', and only partially uncoils upon a plurality of rotations of the contact location 8'. The bifilar spiral coil spring 12' is secured only by the connection lines 20' at its opposite ends to the two contact locations 6' and 8', whereby it uncoils and slidably moves in response to the direction of rotation of the rotatable contact location 8', and upon reversal of such rotation, recovers its original shape and position between the two contact locations 6' and 8'.

Figure 1:
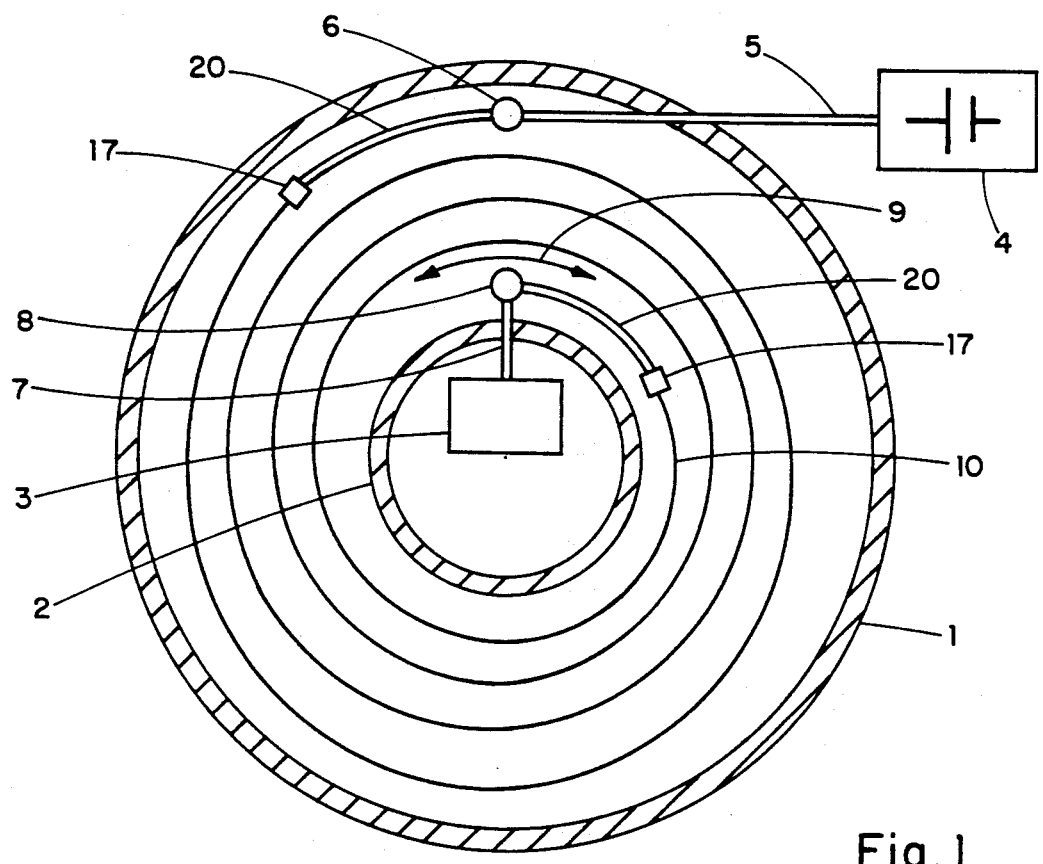
FIG. 1 is a schematic view of a first apparatus in accordance with the invention for maintaining an electrical conduction path between two contact locations one of which is rotatable with respect to the other, the conduction path comprising a length of flat ribbon cable formed as a coiled spring having its turns lying concentric to each other, and a connection line connected, by way of a connection assembly, between each end of the flat ribbon cable and one of the contact locations.
Figure 2:
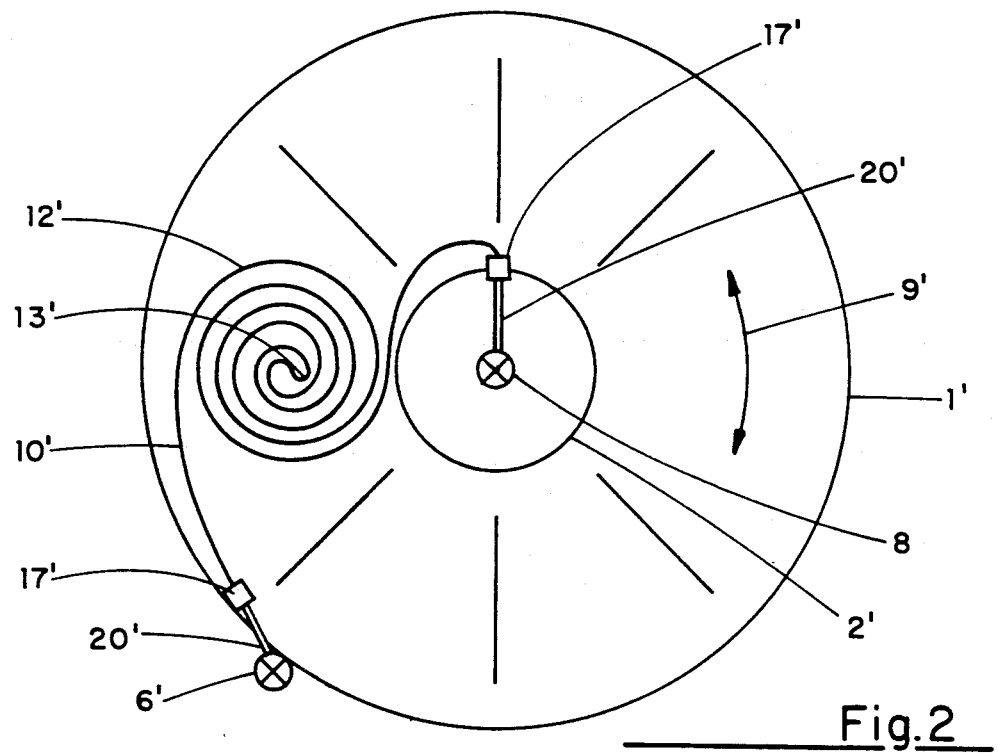
FIG. 2 is a schematic view of a second apparatus in accordance with the invention for maintaining an electrical conduction path between two contact locations one of which is rotatable with respect to the other, such conduction path comprising length of flat ribbon cable formed as a bifilar spiral coil spring, and a connection line connected, by way of a connection assembly, between each end of the flat ribbon cable and one of the contact locations.

As the connection assembly 17 and connection line 20 employed in the apparatus of FIG. 1, and the connection assembly 17' and connection line 20' employed in the apparatus FIG. 2 are identical as to structure and the manner in which they are connected, respectively to the flat ribbon cable 10 and 10'; only one such connection assembly and connection line shall be described hereafter.

Figure 3:
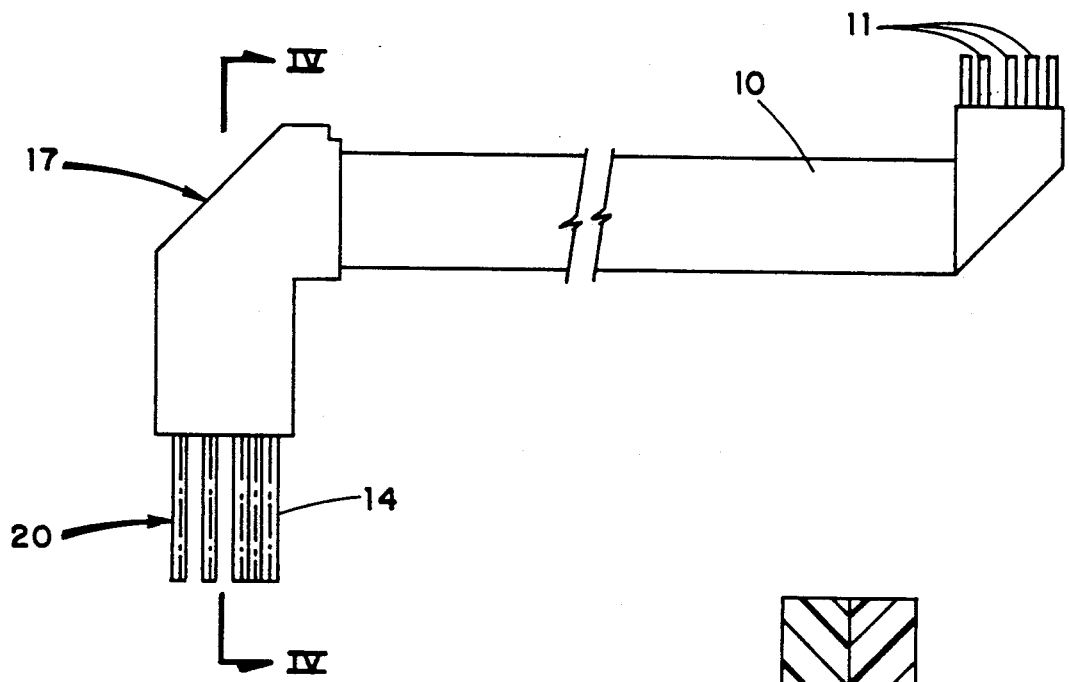
FIG. 3 is a plan view of a length of flat ribbon cable of a priorly known type employed in the apparatus of FIGS. 1 and 2, including a plurality of electrical conductors, such cable having an end portion which is folded across the immediately adjacent portion to form an end thereof that is serially connected to connection line, by way of a connection assembly.

FIG. 3 illustrates the manner in which each end portion of the flat ribbon cable 10 is folded across an immediately adjacent portion of the cable 10 to form a change in the longitudinal direction of the cable 10 of approximately 90 degrees. At one end of the flat ribbon cable 10 there is provided a connection assembly 17 that permits the serial connection of each of a plurality of electrical conductors 11 of the flat ribbon cable 10 to each of a similar plurality of connection conductors 14 of the connection line 20.

Figure 4:
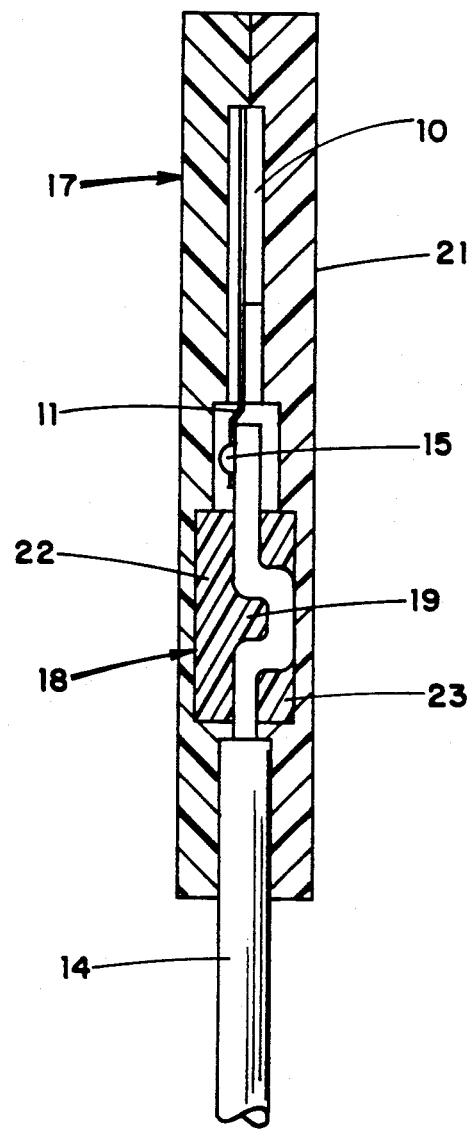
FIG. 4 is a enlarged sectional view taken along IV—IV of FIG. 3

As illustrated in FIG. 4, the connection assembly 17 comprises a protective sheath 21 and a clamping body 18 each of which are comprised of insulating material. Each of the ends of the electrical conductors 11 at one end of the flat ribbon cable 10 are connected, at a connection location 15, to an end of one of the connection conductors 14 by means of soldering or crimping. To provide a means of protecting and axially fixing the connection location 15 of each of the serially connected conductors 11 and 14, a portion of the insulation on each of the connection conductors 14 is removed so as to permit the adjacent connection locations 15 of such conductors to be positioned within the protective sheath 21, while the uninsulated portion of such connection conductor 14 is axially fixed within the clamping body 18.

The clamping body 18 comprises a pair of clamping segments 22 and 23 which have a closed position maintained by a locking mechanism (not shown). The connection conductors 14 are longitudinally fixed in the clamping body 18 by means of at least two bends in their longitudinal direction about a protrusion 19 in the clamping body 18. As illustrated in FIG. 4, the clamping segment 22 has a protrusion 19 with rectangular edges, and the clamping segment 23 has a rectangular cavity with an uninsulated portion of the connection conductor 14 bending about the protrusion 19, with four deflections of about 90 degrees each, so that the end of such connection conductor 14 is again disposed in the longitudinal axis of the connection line 20. The deflection angles may, of course, differ in degrees and-/or number, it being only necessary to assure that the connection conductor 14 is axially fixed in the clamping body 18. The clamping body 18 is preferably comprised of a thermoplastic material. The connection conductors 14 are preferably of thickness much greater than that of the electrical conductors 11, and may be preshaped for their positioning within the clamping body 18.

Upon the axial fixing of the connection conductors 14 of the connection line 20 within the clamping body 18, the protective sheath 21 is formed about the serially connected conductors 11 and 14 so as to encompass the adjacent connection locations 15, while being positioned about and engaging the clamping body 18 so as to restrict axial movement therebetween. Injection molding is preferably employed in such formation of the protective sheath 21 about the adjacent connection locations 15 and the clamping body 18.

While the invention has been described in connection with exemplary embodiments thereof, it will be understood that many modifications will be apparent to those of ordinary skill in the art, and that this application is intended to cover any adaptation or variation thereof. Therefore, it is manifestly intended that the invention be only limited by the claims and equivalents thereof.

What is claimed:

1. In an apparatus for providing an electrical conductive path between a first contact location and a second contact location rotatable one with respect to the other, said electrical conductive path comprising a flat ribbon cable having a plurality of electrical conductors and being wound in the manner of a coiled spring; the improvement comprising each of said electrical conductors having an uninsulated end portion thereof serially connected at a connection location to one of a plurality of connection conductors at an uninsulated end portion thereof; and a connection assembly comprising:

a clamping body of insulating material positioned about and engaging a segment of each of said uninsulated end portions of each of said connection conductors, said engagement being removed from said connection location of each of said serially connected conductors, said clamping body comprising a pair of clamping segments closable one against the other, one of said clamping segments including protrusion means about which each of said uninsulated end portions of said connection conductors axially bend at least twice so as to restrict axial movement thereof; and a protective sheath of insulating material axially positioned about said connection location of each of said serially connected conductors, and axially positioned about and engaging said clamping body so as to restrict axial movement therebetween.

2. An apparatus in accordance with claim 1 wherein said protective sheath is of a plastic material having a locked condition about said clamping body.

3. An apparatus in accordance with claim 1 wherein said protective sheath is an injected molded sheath formed about said clamping body and said connection locations of said serially connected conductors.

4. An apparatus in accordance with claim 1, wherein said protrusion means has a rectangular configuration.

* * * * *